United States Patent
Vogler et al.

(10) Patent No.: US 9,453,536 B2
(45) Date of Patent: Sep. 27, 2016

(54) WHEEL HUB MOTOR WITH POTENTIAL EQUALIZATION

(71) Applicant: Schaeffler Technologies GmbH & Co. KG, Herzogenaurach (DE)

(72) Inventors: Tobias Vogler, Herzogenaurach (DE); Dorothee Stirnweiss, Pommersfelden (DE); Darius Dlugal, Schwebheim (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 14/380,798

(22) PCT Filed: Feb. 22, 2013

(86) PCT No.: PCT/EP2013/053509
§ 371 (c)(1),
(2) Date: Aug. 25, 2014

(87) PCT Pub. No.: WO2013/143791
PCT Pub. Date: Oct. 3, 2013

(65) Prior Publication Data
US 2015/0008721 A1    Jan. 8, 2015

(30) Foreign Application Priority Data
Mar. 26, 2012  (DE) .......... 10 2012 204 795

(51) Int. Cl.
*B60K 7/00* (2006.01)
*F16C 41/00* (2006.01)
(Continued)

(52) U.S. Cl.
CPC .......... *F16C 41/002* (2013.01); *B60K 7/0007* (2013.01); *F16C 33/723* (2013.01);
(Continued)

(58) Field of Classification Search
CPC ............................ B60K 2007/0038
USPC ...................... 180/65.51; 384/262
See application file for complete search history.

(56) References Cited

U.S. PATENT DOCUMENTS 3,608,661 A * 9/1971 Arnot ............ B60K 7/0007
180/10
4,402,374 A * 9/1983 Knur ............. B60K 7/0007
180/65.7

(Continued)

FOREIGN PATENT DOCUMENTS

CN  201031877  3/2008
DE  10162818   6/2003
(Continued)

*Primary Examiner* — Jeffrey J Restifo
(74) *Attorney, Agent, or Firm* — Davidson, Davidson & Kappel, LLC

(57) ABSTRACT

A wheel hub motor for driving a motor vehicle is provided. Aging of the rolling element bearings used to support the rotor is prevented, while at the same time minimizing the emission of electromagnetic waves, in that the wheel hub motor includes a—rotor,—a hub (1),—a wheel bearing having a first bearing ring (2) which is non-rotatably and electrically conductively connected to the hub (1), and a second bearing ring (3) which is non-rotatably and electrically conductively connected to the rotor, and—a contact element (4) for creating an electrically conductive connection between said bearing rings (2, 3), the contact element (4) being supported against the hub (1) via a spring (6) and has a pressure contact with a potential equalization element (5) that is non-rotatably and electrically conductively connected to the second bearing ring (3).

11 Claims, 3 Drawing Sheets

(51) Int. Cl.
*F16C 33/72* (2006.01)
*H02K 5/173* (2006.01)
*F16C 19/18* (2006.01)

(52) U.S. Cl.
CPC ............. *H02K 5/173* (2013.01); *H02K 11/40* (2016.01); *B60K 2007/0038* (2013.01); *B60K 2007/0092* (2013.01); *F16C 19/185* (2013.01)

(56) References Cited

U.S. PATENT DOCUMENTS

| | | | |
|---|---|---|---|
| 4,487,593 A * | 12/1984 | Welschof Hans-Heinrich | ... B60B 27/0005 464/111 |
| 4,548,454 A * | 10/1985 | Zeller | ...... B62D 1/10 439/1 |
| 5,163,528 A * | 11/1992 | Kawamoto | ...... B60K 7/0007 180/65.51 |
| 5,172,984 A | 12/1992 | Lederman | |
| 5,209,701 A * | 5/1993 | Ishikawa | ...... B60B 27/0005 301/105.1 |
| 5,398,776 A * | 3/1995 | Forster | ...... B60K 7/0015 180/247 |
| 5,820,506 A * | 10/1998 | Mann | ...... B60K 7/0015 475/83 |
| 5,865,543 A * | 2/1999 | MacLean | ...... F16C 19/52 384/448 |
| 5,883,511 A * | 3/1999 | Foster | ...... G01P 1/026 324/174 |
| 6,109,794 A * | 8/2000 | Bertetti | ...... F16C 19/184 277/565 |
| 6,203,441 B1 * | 3/2001 | Iarrera | ...... B60B 27/0005 29/243.56 |
| 6,669,373 B2 * | 12/2003 | Ohtsuki | ...... F16C 19/185 277/351 |
| 7,556,580 B2 * | 7/2009 | Saito | ...... B60K 7/0007 180/65.51 |
| 8,307,931 B2 * | 11/2012 | Akamatsu | ...... B60K 7/0007 180/65.27 |
| 8,596,439 B2 * | 12/2013 | Gassmann | ...... B60K 17/3465 180/65.51 |
| 8,932,166 B2 * | 1/2015 | Suzuki | ...... H02K 7/116 180/337 |
| 8,944,196 B2 * | 2/2015 | Yamada | ...... B60K 7/0007 180/65.51 |
| 8,961,361 B2 * | 2/2015 | Ishizuka | ...... F16H 57/08 180/184 |
| 9,010,471 B2 * | 4/2015 | Lakehal-Ayat | ...... F16C 41/004 180/65.51 |
| 2002/0106284 A1 * | 8/2002 | Forster | ...... F03C 1/0655 417/222.1 |
| 2003/0102711 A1 * | 6/2003 | Vignotto | ...... B60B 27/02 301/35.627 |
| 2004/0007406 A1 * | 1/2004 | Laurent | ...... B60K 7/0007 180/65.6 |
| 2004/0234182 A1 * | 11/2004 | Tajima | ...... B60B 27/00 384/544 |
| 2005/0257970 A1 * | 11/2005 | Kakinami | ...... B60K 7/00 180/65.51 |
| 2005/0257971 A1 * | 11/2005 | Kakinami | ...... B60K 7/00 180/65.51 |
| 2007/0181357 A1 * | 8/2007 | Saito | ...... B60K 7/0007 180/65.51 |
| 2009/0003746 A1 * | 1/2009 | Norimatsu | ...... B60B 27/0084 384/454 |
| 2009/0101424 A1 * | 4/2009 | Suzuki | ...... B60K 7/0007 180/65.51 |
| 2009/0202186 A1 * | 8/2009 | Langer | ...... B60B 27/0005 384/517 |
| 2009/0252447 A1 * | 10/2009 | Hirai | ...... B60B 27/00 384/513 |
| 2010/0074568 A1 * | 3/2010 | Uchiyama | ...... B60B 7/00 384/480 |
| 2010/0119185 A1 * | 5/2010 | Fischer | ...... B60B 27/0005 384/517 |
| 2012/0006608 A1 * | 1/2012 | Suzuki | ...... B60K 7/0007 180/65.51 |
| 2012/0248849 A1 * | 10/2012 | Fischer | ...... F16D 63/006 301/6.1 |
| 2013/0049439 A1 * | 2/2013 | Yamada | ...... B60B 7/00 301/6.5 |
| 2013/0071057 A1 * | 3/2013 | Fischer | ...... B60B 27/0005 384/476 |
| 2014/0090909 A1 * | 4/2014 | Lakehal-Ayat | ...... F16C 41/004 180/65.51 |
| 2014/0166378 A1 * | 6/2014 | Mair | ...... B60K 7/0007 180/65.6 |
| 2014/0353056 A1 * | 12/2014 | Hirano | ...... B60K 7/0007 180/65.51 |
| 2015/0008721 A1 * | 1/2015 | Vogler | ...... B60K 7/0007 301/6.5 |
| 2015/0144410 A1 * | 5/2015 | Fraser | ...... B60K 7/0007 180/65.51 |

FOREIGN PATENT DOCUMENTS

| | | |
|---|---|---|
| DE | 102006040223 A1 | 3/2008 |
| DE | 102010022320 | 12/2011 |
| EP | 1382476 B1 | 1/2004 |
| JP | H05288214 | 11/1993 |
| JP | 893755 | 4/1996 |
| JP | 2009243695 | 10/2009 |
| JP | 4656740 | 3/2011 |

* cited by examiner

WHEEL HUB MOTOR WITH POTENTIAL EQUALIZATION

The present invention relates to a wheel hub motor for driving a motor vehicle.

BACKGROUND

In electrically driven vehicles, in particular, it is known to dispose the traction motor directly in the wheel to be driven. The rotor of the electric traction motor may be connected directly to the rim of the wheel. Such a concept is known from DE102006040223A1 and is referred to as direct drive. An alternative design is described in EP1382476B1, where the electric motor acts via a transmission on the wheel to be driven.

In either case, the drive must comply with electromagnetic compatibility (EMC) regulations. However, the electromagnetic fields generated by the stator may induce voltages in the rotor, which may cause a current to flow from the rotor via the rotor shaft toward ground via the rolling element bearings. In particular at high rotational speeds, the rolling element bearings disposed between the bearing rings lose mechanical contact with the bearing rings, so that the rolling elements are spaced by a lubricant film from at least one of the bearing rings. However, the electrically insulating lubricant is of limited dielectric strength. If the induced electric voltage results in partial discharges in the lubricant or causes a dielectric breakdown, then radiation is emitted which may not be acceptable under EMC aspects. Moreover, such a breakdown may result in contact erosion on bearing rings and rolling elements, resulting in premature aging of said components.

German Patent Application DE102010022320A1 describes a wheel hub motor for driving a motor vehicle having the features set forth in the preamble of claim 1. Here, bearing currents and the emission of electromagnetic waves are reduced by providing an electrically conductive connection between the rotor and the stator of the electric machine via a contact element.

SUMMARY OF THE INVENTION

It is an object of the present invention to minimize in a wheel hub drive the aging of the rolling element bearings used to support the rotor and to prevent emission of electromagnetic waves, while providing a particularly cost-effective solution.

The present invention provides a wheel hub motor. Such a wheel hub motor for driving a motor vehicle includes:
 a rotor
 a hub
 a wheel bearing having a first bearing ring which is non-rotatably and electrically conductively connected to the hub, and a second bearing ring which is non-rotatably and electrically conductively connected to the rotor, and
 a contact element for creating an electrically conductive connection between said bearing rings,
with the contact element being supported against the hub via a spring and having a pressure contact with a potential equalization element that is non-rotatably and electrically conductively connected to the second bearing ring.

Advantageous specific embodiments of the present invention will become apparent from the dependent claims.

The present invention provides a significant structural improvement over the design described in DE102010022320A1. The present invention is based on the realization that the design complexity of the wheel hub drive, and thus the required manufacturing costs, can be significantly reduced if the rotating portion of the wheel hub drive can be formed by secondary shaping or deep drawing. This manufacturing advantage is obtained because the contact element that electrically conductively connects the two bearing rings of the wheel bearing, and thereby prevents the formation of bearing currents which would deteriorate the lubricant, is supported against the hub by the spring. As used here and throughout this document, the term "hub" is understood to mean any element for mounting a wheel on a shaft, an axle, or a trunnion.

In accordance with the present invention, the spring presses the contact element against the potential equalization element, which is in connection with the rotating portion of the wheel hub motor, In an advantageous refinement of the present invention, the potential equalization element is configured as a covering cap for the wheel bearing and only has to serve as a counter-face for pressure contact. It can be made as a simple deep-drawn part without requiring any machining. Since the stationary portion of the wheel bearing, in particular the hub, must be machined anyway, the manufacturing effort is here not increased in comparison with the design described DE102010022320A1.

Moreover, by integrating the spring-loaded contact element into the stationary portion of the wheel bearing; i.e., the hub, an advantage is obtained in terms of visual appearance, since the potential equalization element which, in particular, is in the form of a covering cap can thereby be made visually more appealing. In addition, contact can be provided in a neutral manner in terms of space requirements.

In an advantageous embodiment of the present invention, the contact element is captively connected to the hub. This prevents the contact element from falling out even when the wheel bearing is open.

In another advantageous embodiment of the present invention, the hub includes a blind hole in which the contact element is mounted. The spring that presses the contact element against the potential equalization element is attached to the bottom of the blind hole. The blind hole may be formed by various machining techniques including, for example, turning, milling and drilling.

In an advantageous embodiment of the present invention, the blind hole has an opening which is located opposite the bottom and has a diameter selected such that the contact element is captively held in the blind hole, thereby providing a particularly simple way of preventing the contact element from falling out when the wheel bearing is open. The aforesaid diameter of the entrance opening of the blind hole may be obtained, in particular, by annular staking, point staking or crimping.

In another advantageous embodiment of the present invention, the contact element has an approximately punctiform contact with the potential equalization element, said contact point being located on the axis of rotation of the rotor. This structural feature makes it possible to minimize the friction caused by the potential equalization according to the present invention.

Low-friction contact surfaces capable of providing a reliable electrical contact are obtained in an advantageous embodiment where the contact element has a convex-shaped contact surface which creates the aforesaid pressure contact with the potential equalization element.

In particular, it is possible and advantageous to configure the contact element as a ball. This ball can be very easily supported by a coil spring against the bottom of a blind hole in the hub.

In order to reduce wear and prevent contamination of the lubricant of the rolling element bearing, one embodiment of the present invention provides for the potential equalization element to include a hardened plate with which the contact element creates the aforesaid pressure contact.

A motor vehicle having a wheel hub motor according to one of the previously described exemplary embodiments enables completely novel vehicle concepts by omission of the central drive motor, which usually occupies the front motor compartment of a motor vehicle. It is useful to provide each of the four wheels with a separate wheel hub motor. This also enables easy implementation of a wheel-selective drive.

BRIEF DESCRIPTION OF THE DRAWINGS

The present invention will now be further illustrated and described with reference to the exemplary embodiments shown in the drawings, in which.

DETAILED DESCRIPTION

Figure 1:
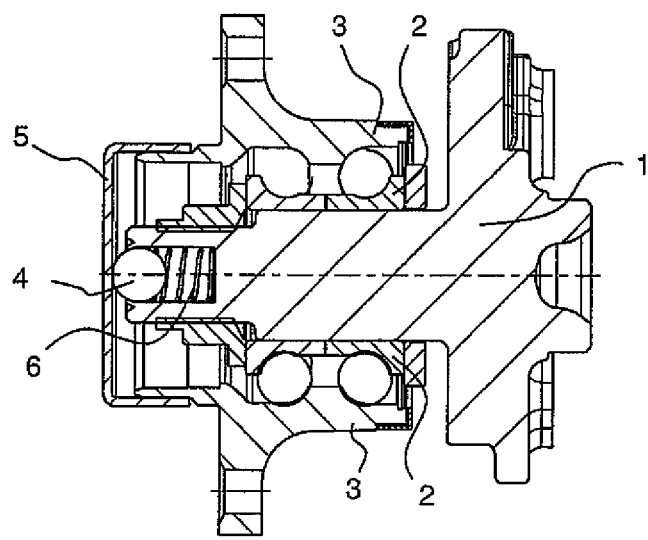
FIG. 1 shows a first embodiment of a bearing unit for a wheel hub motor.

Like or functionally equivalent parts are identified by the same reference numerals in all figures.

FIG. I illustrates a first embodiment of a bearing unit for a wheel hub motor according to the present invention. The elements shown can be roughly divided into two classes. Firstly, there are elements that are mechanically non-rotatably coupled to the rotor of the wheel hub motor and therefore themselves rotate during operation. Secondly, the bearing unit shown contains elements that are mechanically non-rotatably coupled to the stator of the electric machine and therefore are stationary from a rotational point of view.

The wheel bearing unit includes, as a stationary element, a hub 1 on which is disposed a first bearing ring 2 of a double-row rolling element bearing. In the embodiment shown, first bearing ring 2 is an inner ring which is non-rotatably connected to hub 1 and therefore, like the hub, is stationary from a rotational point of view. The double-row rolling element bearing further includes a second bearing ring 3, which is in the form of an outer ring and is electrically and mechanically connected to the rotor of the wheel hub motor.

Furthermore, the bearing unit shown includes a contact element 4 and a potential equalization element 5. Contact element 4 is supported by a preloaded spring 6 against the bottom of a blind hole formed in hub 1 and extending in the axial direction thereof. Contact element 4 is configured as a ball and is in electrically conductive connection with hub 1, and thus with the stator of the wheel hub motor. The ball is prevented from falling out by annular staking in the region of the opening of the blind hole and is thereby captively connected to hub 1. The preloaded spring presses the ball in a direction toward the opening of the blind hole.

Potential equalization element 5 is here in the form of a covering cap of the wheel bearing and, when in the mounted state, bears against the ball, and thus against the force of the spring, creating a pressure contact between the covering cap and the ball. Since the covering cap is in connection with the outer bearing ring, which in turn is electrically conductively connected to the rotor of the electric machine, an electrically conductive connection is created between the rotor and hub 1 at the point of pressure contact between the covering cap and the ball. If, during operation, the stator induces a voltage in the rotor of the wheel hub motor, then any resulting currents can drain through potential equalization element 5 and contact element 4 to hub 1, and thus to the housing of the electric machine. Without the aforesaid connection between the stationary and rotating portions, current flow would be through the rolling element bearing, and thus through the lubricant thereof. However, the path through the rolling element bearings is electrically short-circuited by the covering cap and the ball, thereby preventing the lubricant from aging and improving the electromagnetic compatibility of the assembly.

Figure 2:
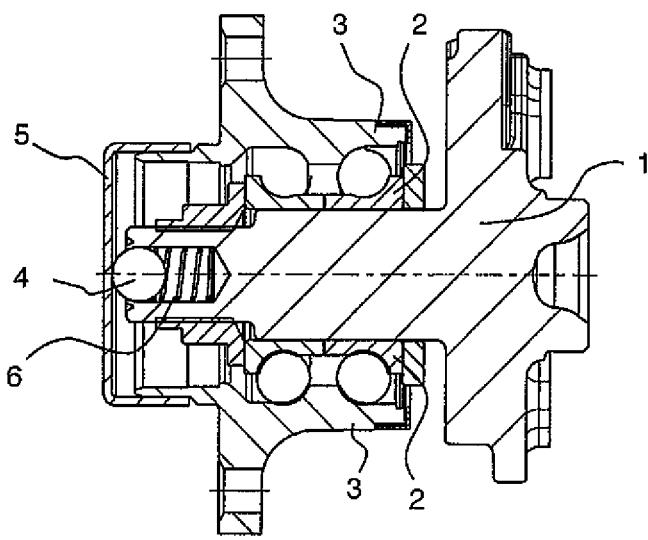
FIG. 2 shows a second embodiment of a bearing unit for a wheel hub motor.

FIG. 2 illustrates a second embodiment of a bearing unit for a wheel hub motor. This embodiment differs from that shown in FIG. 1 in the configuration of the blind hole. In the embodiment shown here, the blind hole takes the form of a bore drilled into an end face of hub 1.

Figure 3:
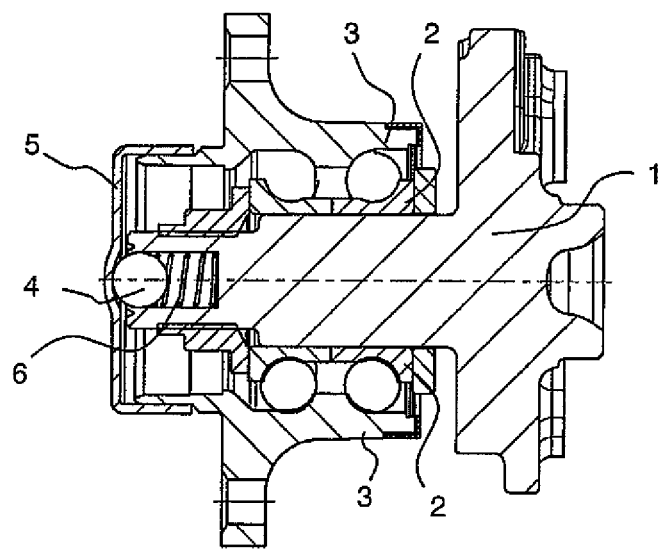
FIG. 3 shows a third embodiment of a bearing unit for a wheel hub motor.

FIG. 3 illustrates a third embodiment of a bearing unit for a wheel hub motor. Potential equalization element 5 is here in the form of a covering cap of the wheel bearing, which has a concave-shaped curvature in the region of contact with the ball. This provides for improved osculation between the ball surface and the covering cap and increases the size of the contact ellipse.

Figure 4:
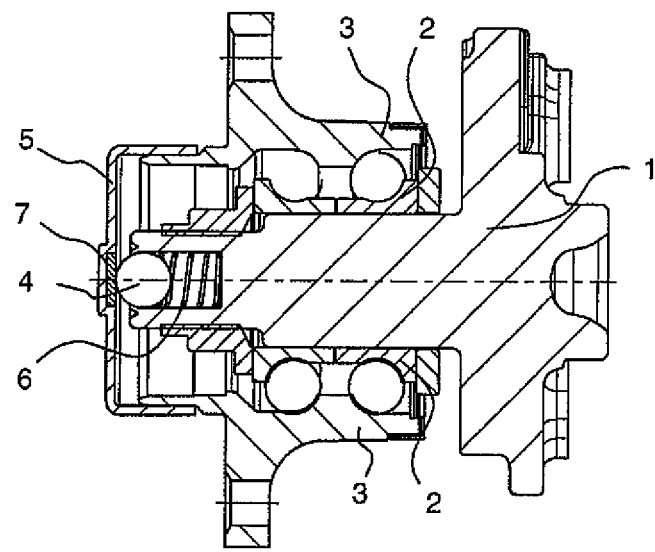
FIG. 4 shows a fourth embodiment of a bearing unit for a wheel hub motor.

FIG. 4 illustrates a fourth embodiment of a bearing unit for a wheel hub motor. This embodiment features a hardened plate 7 within the covering cap. Hardened plate 7 is positioned in the region of the pressure contact created by the ball-shaped contact element 4 and potential equalization element 5. The hardening of the covering cap in the region of the pressure contact reduces the wear of the covering cap and counteracts contamination of the rolling element bearing grease or oil.

Figure 5:
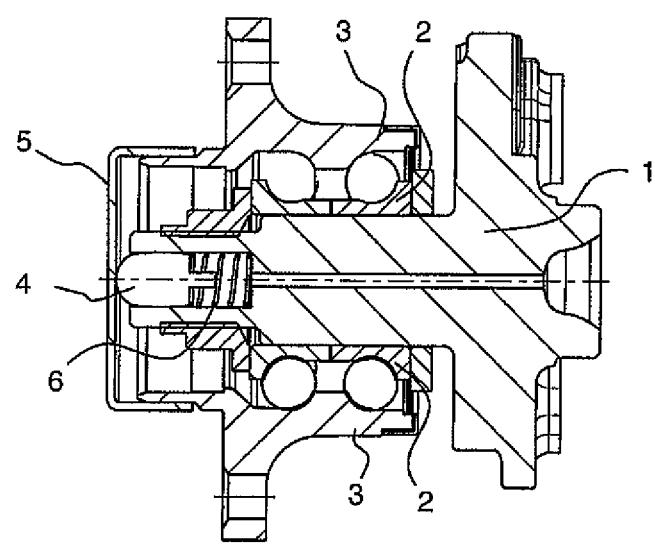
FIG. 5 shows a fifth embodiment of a bearing unit for a wheel hub motor.

FIG. 5 illustrates a fifth embodiment of a bearing unit for a wheel hub motor. The embodiment shown in FIG. 5 differs from the preceding embodiments in the configuration of contact element 4. Here, contact element 4 is approximately mushroom-shaped, with a convex-shaped surface of contact element 4 facing toward potential equalization element 5. Contact element 4 is disposed within a through-hole of hub 1. At the end of hub 1 axially opposite the potential equalization element 5, contact element 4 is fixed by a wire that is passed through the through-hole. Thus, contact element 4 can be prevented from falling out even without annular staking, point staking or crimping.

LIST OF REFERENCE NUMERALS 1 hub
2 first bearing ring
3 second bearing ring
4 contact element
5 potential equalization element
6 spring
7 hardened plate

What is claimed is:

1. A wheel hub motor for driving a motor vehicle comprising:
 a rotor;
 a hub;
 a wheel bearing having a first bearing ring non-rotatably and electrically conductively connected to the hub, and a second bearing ring non-rotatably and electrically conductively connected to the rotor, and
 a contact element for creating an electrically conductive connection between the first and second bearing rings,
 wherein the contact element is supported against the hub via a spring and has a pressure contact with a potential equalization element non-rotatably and electrically conductively connected to the second bearing ring.

2. The wheel hub motor as recited in claim 1 wherein the contact element is captively connected to the hub.

3. The wheel hub motor as recited in claim 1 wherein the hub includes a blind hole, the contact element being mounted in the blind hole, and wherein the spring pressing the contact element against the potential equalization element is attached to the bottom of the blind hole.

4. The wheel hub motor as recited in claim 3 wherein the blind hole has an opening located opposite the bottom and has a diameter selected such that the contact element is captively held in the blind hole.

5. The wheel hub motor as recited in claim 1 wherein the contact element has an approximatively punctiform contact with the potential equalization element, the contact point being located on the axis of rotation of the rotor.

6. The wheel hub motor as recited in claim 1 wherein the contact element has a convex-shaped contact surface creating the pressure contact with the potential equalization element.

7. The wheel hub motor as recited in claim 6 wherein the contact element is configured as a ball.

8. The wheel hub motor as recited in claim 1 wherein the potential equalization element is configured as a covering cap for the wheel bearing.

9. The wheel hub motor as recited in claim 1 wherein the potential equalization element includes a hardened plate, the contact element creating the pressure contact with the hardened plate.

10. A motor vehicle comprising the wheel hub motor as recited in claim 1.

11. A wheel hub motor for driving a motor vehicle comprising:
 a rotor;
 a hub;
 a wheel bearing having a first bearing ring non-rotatably and electrically conductively connected to the hub, and a second bearing ring non-rotatably and electrically conductively connected to the rotor, and
 a contact element for creating an electrically conductive connection between the first and second bearing rings,
 wherein the contact element is supported continuously during operation against the hub via a spring and has a pressure contact with a potential equalization element non-rotatably and electrically conductively connected to the second bearing ring.

* * * * *